US010750557B1

(12) United States Patent
Kim

(10) Patent No.: US 10,750,557 B1
(45) Date of Patent: Aug. 18, 2020

(54) SENSOR-BASED PAIRING BETWEEN DEVICE AND VEHICLE

(71) Applicant: Ford Global Technologies, LLC, Dearborn, MI (US)

(72) Inventor: Yu Seung Kim, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/534,421

(22) Filed: Aug. 7, 2019

(51) Int. Cl.
*H04B 7/00* (2006.01)
*H04W 76/14* (2018.01)
*H04W 12/00* (2009.01)
*H04W 12/06* (2009.01)
*H04W 4/48* (2018.01)

(52) U.S. Cl.
CPC ............. *H04W 76/14* (2018.02); *H04W 4/48* (2018.02); *H04W 12/00508* (2019.01); *H04W 12/06* (2013.01)

(58) Field of Classification Search
CPC ........... H04W 76/14; H04W 12/00508; H04W 12/06; H04W 4/80; H04W 8/005
See application file for complete search history.

(56) References Cited

U.S. PATENT DOCUMENTS

| 9,305,411 B2 | 4/2016 | Ricci |
| 9,373,201 B2 | 6/2016 | Jefferies et al. |
| 2015/0061856 A1* | 3/2015 | Raman .................... G08B 21/24 340/457 |
| 2017/0105101 A1* | 4/2017 | Santavicca .............. H04W 4/80 |
| 2018/0009416 A1* | 1/2018 | Maiwand ........... G07C 9/00182 |

* cited by examiner

*Primary Examiner* — Tuan Pham
(74) *Attorney, Agent, or Firm* — Michael Spenner; Brooks Kushman PC

(57) ABSTRACT

A vehicle includes a wireless transceiver, configured to communicate with a mobile device; a vehicle sensor, configured provide vehicle motion data; and one or more processors, configured to responsive to receiving an authentication request from the mobile device, send a request for a device motion fingerprint for a first timeframe to the mobile device, receive the device motion fingerprint from the mobile device, generate a vehicle motion fingerprint for the first timeframe using the vehicle motion data, responsive to a driving maneuver input intensity being greater than an input threshold, compare the vehicle motion fingerprint with the device motion fingerprint to generate a similarity score, and responsive to the similarity score being indicative of at least a predefined threshold level of similarity between the vehicle motion fingerprint and the device motion fingerprint, authenticate a wireless connection between the mobile device and the vehicle via the wireless transceiver.

20 Claims, 6 Drawing Sheets fp_d:
00000000000000000000000000000001001
00100100000000000000000000000000000
00000000000000001111011011000011001111
111111111001001001100100100100100100
000000000000000000000000000000 fp_v:
00000000000000000000000000000000000
10010010000000000000000000000000000
0000000000000000000111011011000011001
1111111111001001001011001000000100100
100100000000000100000000000

700

SENSOR-BASED PAIRING BETWEEN DEVICE AND VEHICLE

TECHNICAL FIELD

The present disclosure generally relates to a pairing method between a mobile device and a vehicle. More specifically, the present disclosure relates to a pairing method between a mobile device and a vehicle based on motion sensor data.

BACKGROUND

Many mobile devices (e.g. smart phones) are being used in the vehicle cabin to provide a better user experience. The mobile devices may be paired with the vehicle in-cabin network via various wireless communication protocols such as Bluetooth, Wi-Fi or the like. A typical wireless authentication and pairing process requires significant user involvement. For instance, the vehicle may prompt a user with a passcode on a display, asking the user to enter the passcode on the mobile device. If the user changes vehicles, the user may need to perform the pairing process again with the new vehicle.

SUMMARY

In one or more illustrative embodiments of the present disclosure, a vehicle includes a wireless transceiver, configured to communicate with a mobile device; a vehicle sensor, configured provide vehicle motion data; and one or more processors, configured to responsive to receiving an authentication request from the mobile device, send a request for a device motion fingerprint for a first timeframe to the mobile device, receive the device motion fingerprint from the mobile device, generate a vehicle motion fingerprint for the first timeframe using the vehicle motion data, responsive to a driving maneuver input intensity being greater than an input threshold, compare the vehicle motion fingerprint with the device motion fingerprint to generate a similarity score representative of similarity between the vehicle motion fingerprint and the device motion fingerprint, and responsive to the similarity score being indicative of at least a predefined threshold level of similarity between the vehicle motion fingerprint and the device motion fingerprint, authenticate a wireless connection between the mobile device and the vehicle via the wireless transceiver, wherein the driving maneuver input intensity includes intensity of input received to at least one of: a gear shifter, a gas pedal, a brake pedal, or a steering wheel.

In one or more illustrative embodiments of the present disclosure, a method for a vehicle includes collecting vehicle motion data via a motion sensor; responsive to receiving an authentication request from a mobile device, sending a request for device motion fingerprint for a first timeframe to the mobile device; receiving the device motion fingerprint from the mobile device; generating a vehicle motion fingerprint for the first timeframe using the vehicle motion data collected via a vehicle sensor; generating an entropy of the vehicle motion fingerprint using a bit frequency of the vehicle motion fingerprint; comparing the entropy with a predefined threshold; responsive to the entropy being greater than the predefined threshold, comparing the vehicle motion fingerprint with the device motion fingerprint to generate a similarity score representative of similarity between the vehicle motion fingerprint and the device motion fingerprint; and responsive to a similarity score being indicative of at least a score threshold level of similarity between the vehicle motion fingerprint and the device motion fingerprint, authenticating a wireless connection between the mobile device and the vehicle.

In one or more illustrative embodiments of the present disclosure, a non-transitory computer-readable medium, includes instructions, when executed by a processor of a vehicle, causing the processor to responsive to receiving an authentication request from a mobile device, send a request for a device motion fingerprint for a first timeframe to the mobile device, receive the device motion fingerprint from the mobile device, generate a vehicle motion fingerprint for the first timeframe using vehicle motion data detected via a vehicle sensor, generate an entropy of the vehicle motion fingerprint using a bit frequency of the vehicle motion fingerprint, compare the entropy with an entropy threshold, responsive to the entropy being greater than the entropy threshold, and a driving maneuver input intensity being greater than an input threshold, compare the vehicle motion fingerprint with the device motion fingerprint to generate a similarity score representative of similarity between the vehicle motion fingerprint and the device motion fingerprint, and responsive to the similarity score being indicative of at least a predefined threshold level of similarity between the vehicle motion fingerprint and the device motion fingerprint, authenticate a wireless connection between the mobile device and the vehicle, wherein the driving maneuver input intensity includes intensity of input received to at least one of: a gear shifter, a gas pedal, a brake pedal, or a steering wheel.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a method and system for pairing a mobile device to a vehicle. More specifically, the present disclosure proposes a method and system for pairing a mobile device to a vehicle based on motion sensing data.

To simplify a pairing process between a vehicle and a mobile device, user intervention is preferably minimized or reduced. Instead, the pairing process may be based on sensor data from collected by both the vehicle and the mobile device. For instance, both the vehicle and the mobile device carried by the user may be provided with motion sensing features enabled by a motion sensor, such as a gyroscope, and/or an accelerometer, to detect motions including acceleration, deceleration or the like. When inside the vehicle, the motions detected by the motion sensors of both the vehicle and the mobile device should be similar and correspond to each other. By comparing the motions of the vehicle and the mobile device, the vehicle may determine the mobile device to pair, without user intervention.

Figure 1:
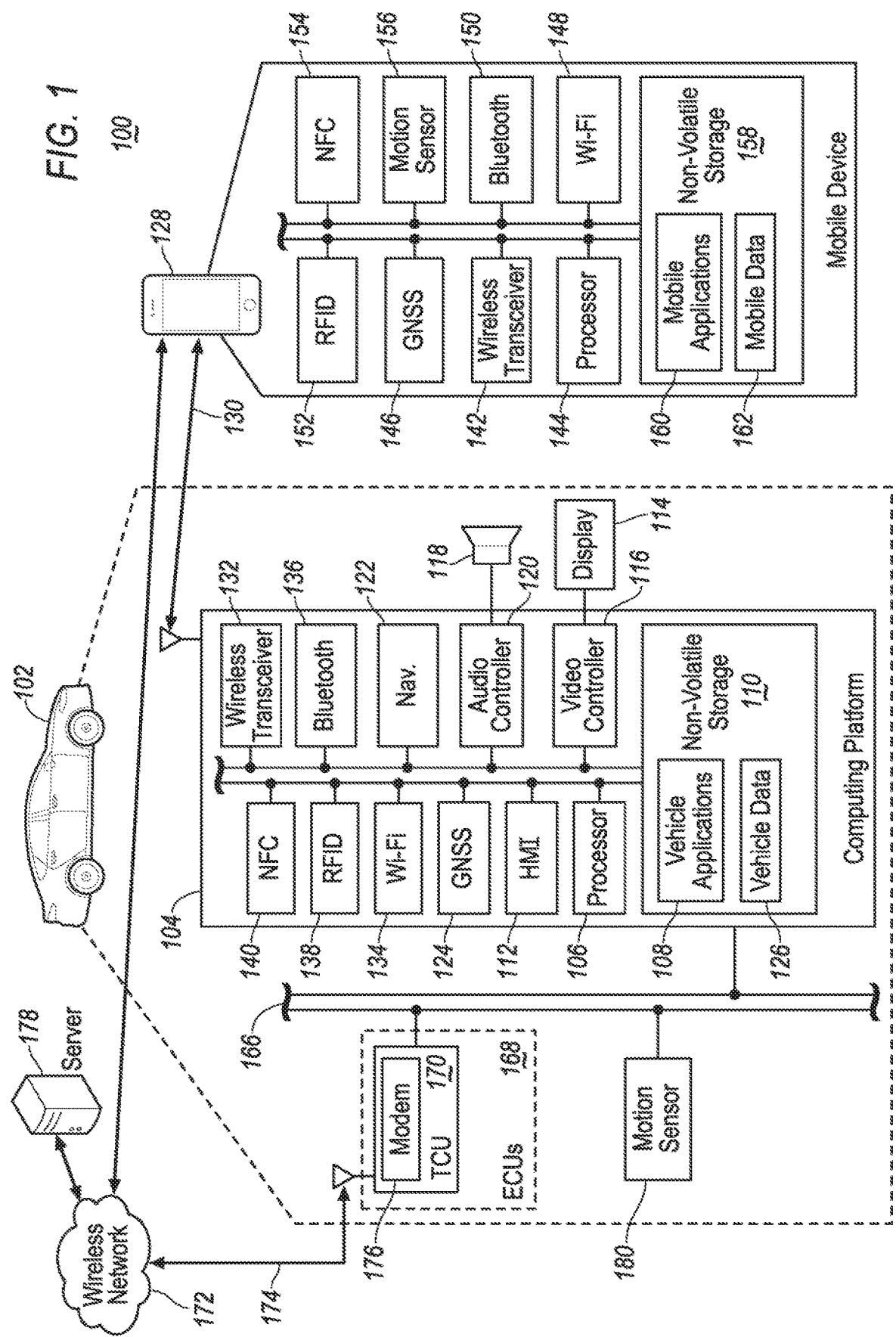
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a battery electric vehicle (BEV), a hybrid electric vehicle (HEV) powered by both an internal combustion engine and one or move electric motors, such as a series hybrid electric vehicle (SHEV), a plug-in hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, digital key processing, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 112 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 configured to provide audio output and input to vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as one the vehicle applications 108.

The computing platform 104 may be configured to wirelessly communicate with a mobile device 128 of the vehicle users/occupants via a wireless connection 130. The mobile device 128 may be any of various types of portable computing devices, such as cellular phones, tablet computers, wearable devices, smart watches, smartfobs, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver, a ultra-wide band (UWB) controller (not shown), and configured to communicate with a compatible wireless transceiver 142 of the mobile device 128.

The mobile device 128 may be provided with a processor 144 configured to perform instructions, commands, and other routines in support of the processes such as navigation, telephone, wireless communication, and multi-media processing. For instance, the mobile device 128 may be provided with location and navigation functions via a navigation controller (not shown) and a GNSS controller 146. The mobile device 128 may be provided with a wireless transceiver 142 in communication with a Wi-Fi controller 148, a Bluetooth controller 150, a RFID controller 152, an NFC controller 154, and other controllers (not shown), configured to communicate with the wireless transceiver 132 of the computing platform 104. The mobile device 128 may be further provided with one or more motion sensors 156 configured to detect motion of the mobile device 128. For instance, the motion sensors 156 may include an accelerometer, gyroscope and/or any sensors configured to measure motion, acceleration, deceleration or the like. The mobile device 128 may be further provided with a non-volatile storage 158 to store various mobile application 160 and mobile data 162.

The computing platform 104 may be further configured to communicate with various components of the vehicle 102 via one or more in-vehicle network 166. The in-vehicle network 166 may include, but is not limited to, one or more of a controller area network (CAN), an Ethernet network, and a media-oriented system transport (MOST), as some examples.

The computing platform 104 may be configured to communicate with various ECUs 168 of the vehicle 102 configured to perform various options. For instance, the computing platform may be configured to communicate with a TCU 170 configured to control telecommunication between vehicle 102 and a wireless network 172 through a wireless connection 174 using a modem 176. The wireless connection 174 may be in the form of various communication network e.g. a cellular network. Through the wireless network 172, the vehicle may access one or more servers 178 to access various content for various purposes. It is noted that the terms wireless network and server are used as general terms in the present disclosure and may include any computing network involving carriers, router, computers, controllers or the like configured to store data and perform data processing functions and facilitate communication between various entities. The ECUs 168 may further include one or more motion sensors 180 configured to detect motion of the vehicle 102. For instance. The motion sensors 180 may include an accelerometer, gyroscope and/or any sensors configured to measure motion, acceleration, deceleration of the vehicle 102.

Figure 2:
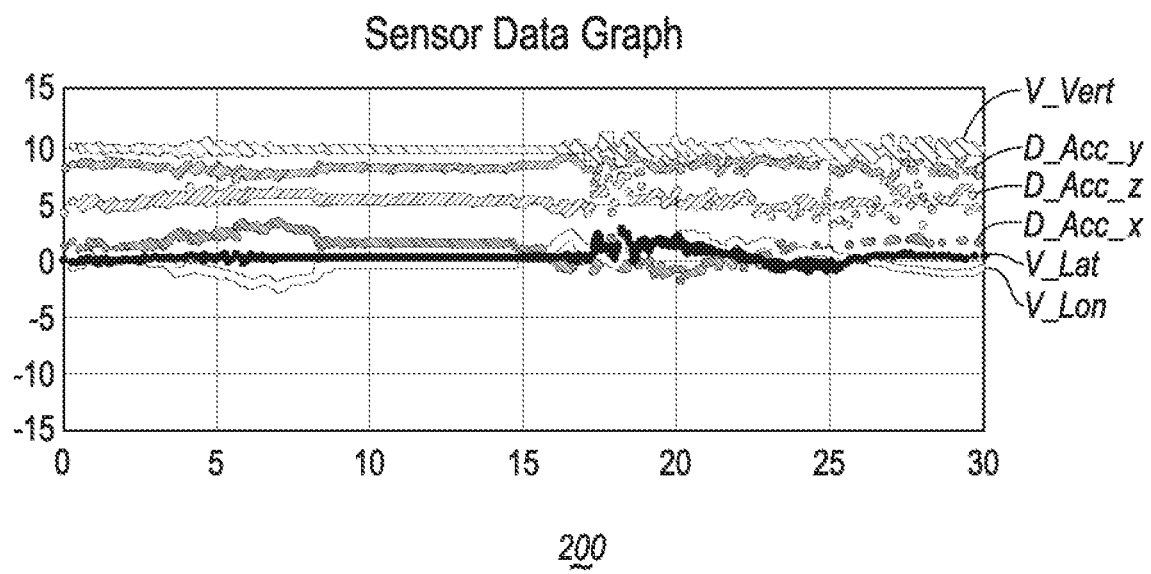
FIG. 2 illustrates an example sensor graph of one embodiment of the present disclosure.

Referring to FIG. 2, a sensor data diagram 200 of one embodiment of the present disclosure is illustrated. With continuing reference to FIG. 1, in the present example, each of the motion sensor 180 of the vehicle 102 and the motion sensor 156 of the mobile device 128 may be configured to detect and measure accelerations on three directions. For instance, the motion sensor 180 may be configured to measure a vertical acceleration V_vert, a lateral acceleration V_lat, and a longitudinal acceleration V_lon. Similarly, the motion sensor 156 may be configured to an acceleration on an x-axis D_Acc_x, an acceleration on a y-axis D_Acc_y, and an acceleration on a z-axis D_Acc_z. When located inside the vehicle 102, the motion sensor 156 of the mobile device 128 should detect substantially the same acceleration/deceleration as the motion sensor 180 detects. However, as illustrated on the sensor data graph 200, data detected by the vehicle motion sensor 180 is different from the one detected via the device motion sensor 156 in magnitude. This phenomenon may be caused by the mobile device 128 not being aligned with the heading direction of vehicle 102 in many cases. Processing of the acceleration data will be described in detail below.

Figure 3:
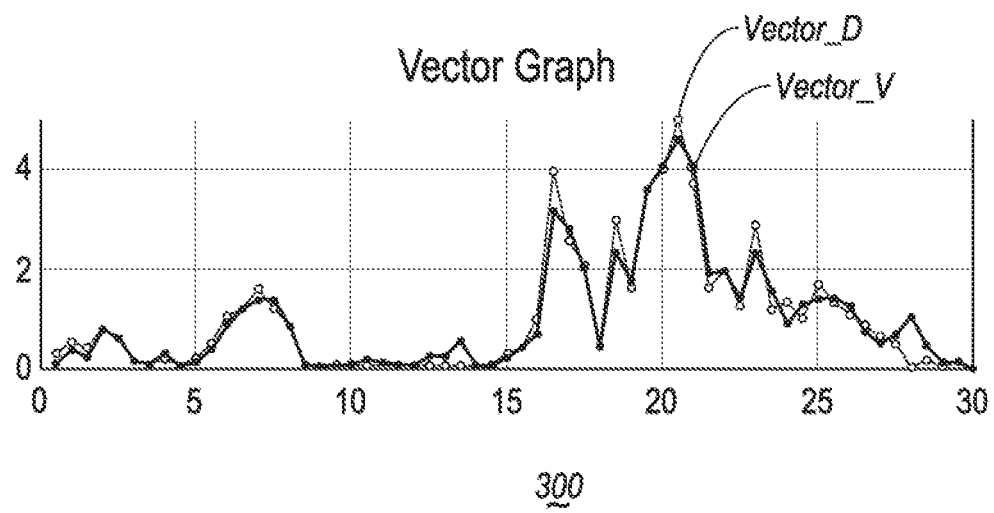
FIG. 3 illustrates an example vector similarity graph of one embodiment of the present disclosure.

Referring to FIG. 3, an acceleration vector diagram 300 of one embodiment of the present disclosure is illustrated. With continuing reference to FIGS. 1 and 2, the vehicle 102 may be configured to calculate a vehicle acceleration magnitude vector Vector_V using the sensor data from the vehicle motion sensor 180. Similarly, the mobile device 128 may be configured to calculate a device acceleration magnitude vector Vector_D using the sensor data from the device motion sensor 156. Details of the calculations will be described below. As illustrated in the diagram 300, the vehicle acceleration Vector_V generally corresponds to the device acceleration Vector_D in the present example as the mobile device 128 is located inside the vehicle 102 detecting substantially the same motion pattern as the vehicle 102 does.

Figure 4:
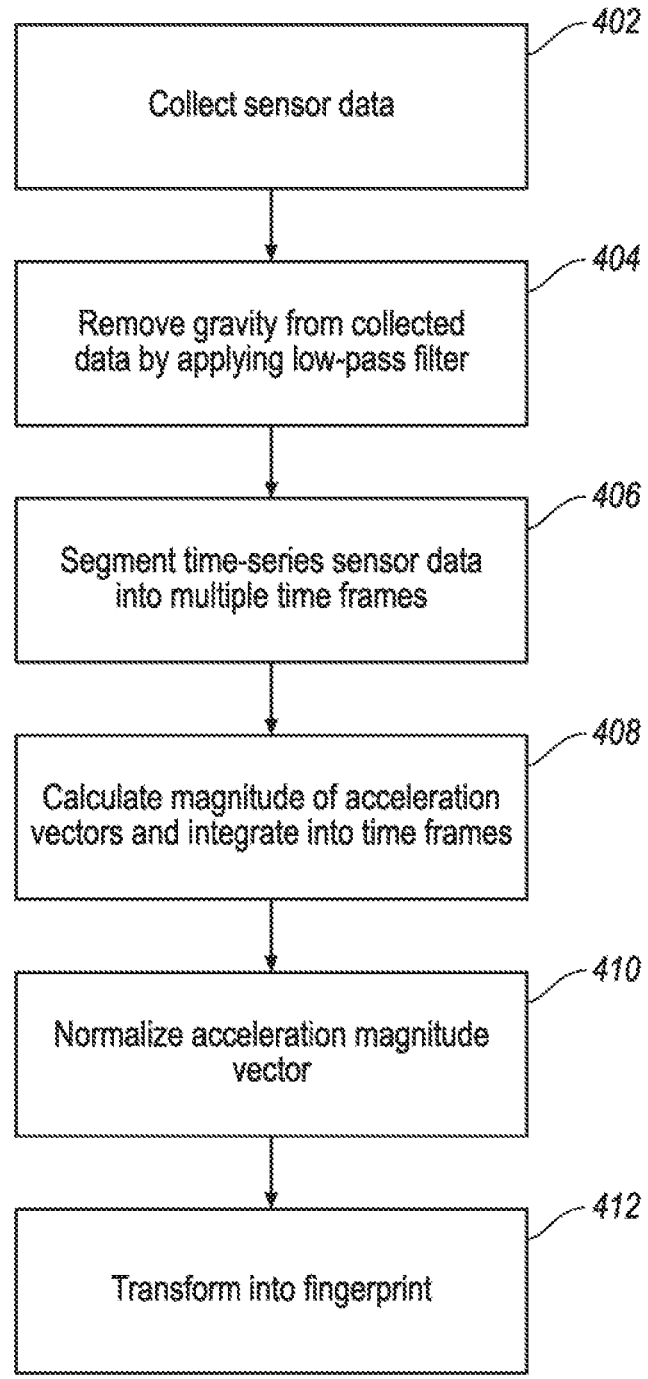
FIG. 4 illustrates an example process diagram for generating sensor fingerprints of one embodiment of the present disclosure.
Figures 5, 7:
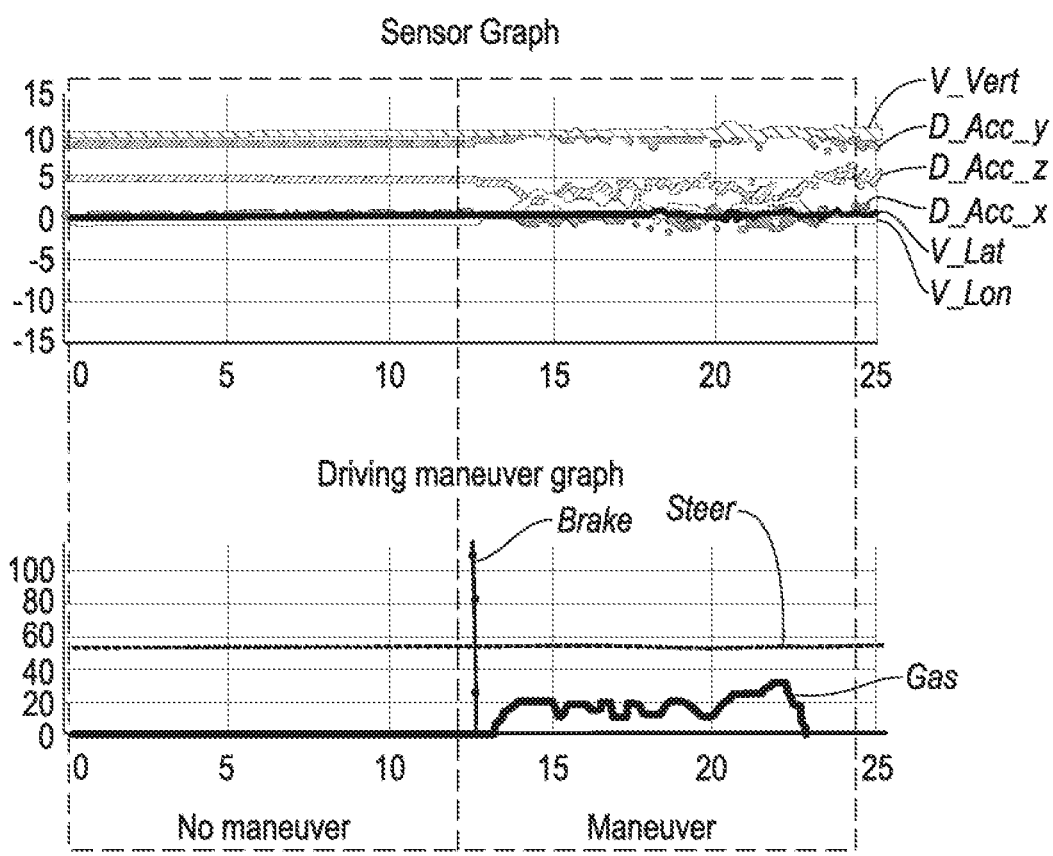
FIG. 5 illustrates an example motion fingerprint diagram of one embodiment of the present disclosure.
FIG. 7 illustrates an example sensor data and driving maneuver graph of one embodiment of the present disclosure.

Referring to FIG. 4, a flow diagram of a process 400 for generating an acceleration fingerprint of one embodiment of the present disclosure is illustrated. With continuing reference to FIGS. 1 to 3, the present process 400 may be implemented in both the vehicle 102 and the mobile device 128 to generate acceleration fingerprint of the respective entity. For the simplicity of the description, the process 400 will be described with reference to the vehicle 102. At operation 402, the computing platform 104 collects vehicle sensor data. The sensor data may include a vertical acceleration V_vert, a lateral acceleration V_lat, and a longitudinal acceleration V_lon measured by the motion sensor 180 as described above. At operation 404, the computing platform 104 removes the gravity vector from the collected vehicle data. There are multiple ways to remove the gravity vector. For instance, the vehicle sensor data may be sent to low-pass filter to filter out the gravity vector. Alternatively, if the vehicle 102 is parked on a flat surface (e.g. detected by a gyroscope), the computing platform 104 may directly remove V_vert to remove the gravity vector. After the gravity vector is successfully removed, at operation 406, the computing platform 104 segments the sensor data into multiple predefined time frames (e.g. a 5-second frame). At operation 408, the computing platform 104 calculates the magnitude of acceleration vectors and integrates the calculation results into the predefined time frames. At operation 410, the computing platform 104 normalizes the magnitude of acceleration results as calculated and integrated into the time frames to obtain a normalized acceleration magnitude vector Vector_V as illustrated with reference to FIG. 3. Since configurations of the vehicle motion sensor 180 and the device motions sensor 156 may be different, the normalization operation may be necessary to support result comparison in some embodiments. Next, at operation 412, the computing platform 104 transforms the acceleration magnitude vector Vector_V into a motion fingerprint. The motion fingerprint may be presented in various forms. For instance, the motion fingerprint may be in the form of a binary string consisting of multiple digits of binary numbers as illustrated in FIG. 5. In the example motion fingerprints in FIG. 5, fp_d represents the motion fingerprint of the mobile device 128 generated based on sensor data from the motion sensor 156, and fp_v represents the motion fingerprint of the vehicle 102 generated based on sensor data from the motion sensor 180. In general, "0" represents no motion detected, while "1" represents motion is detected.

Figure 6:
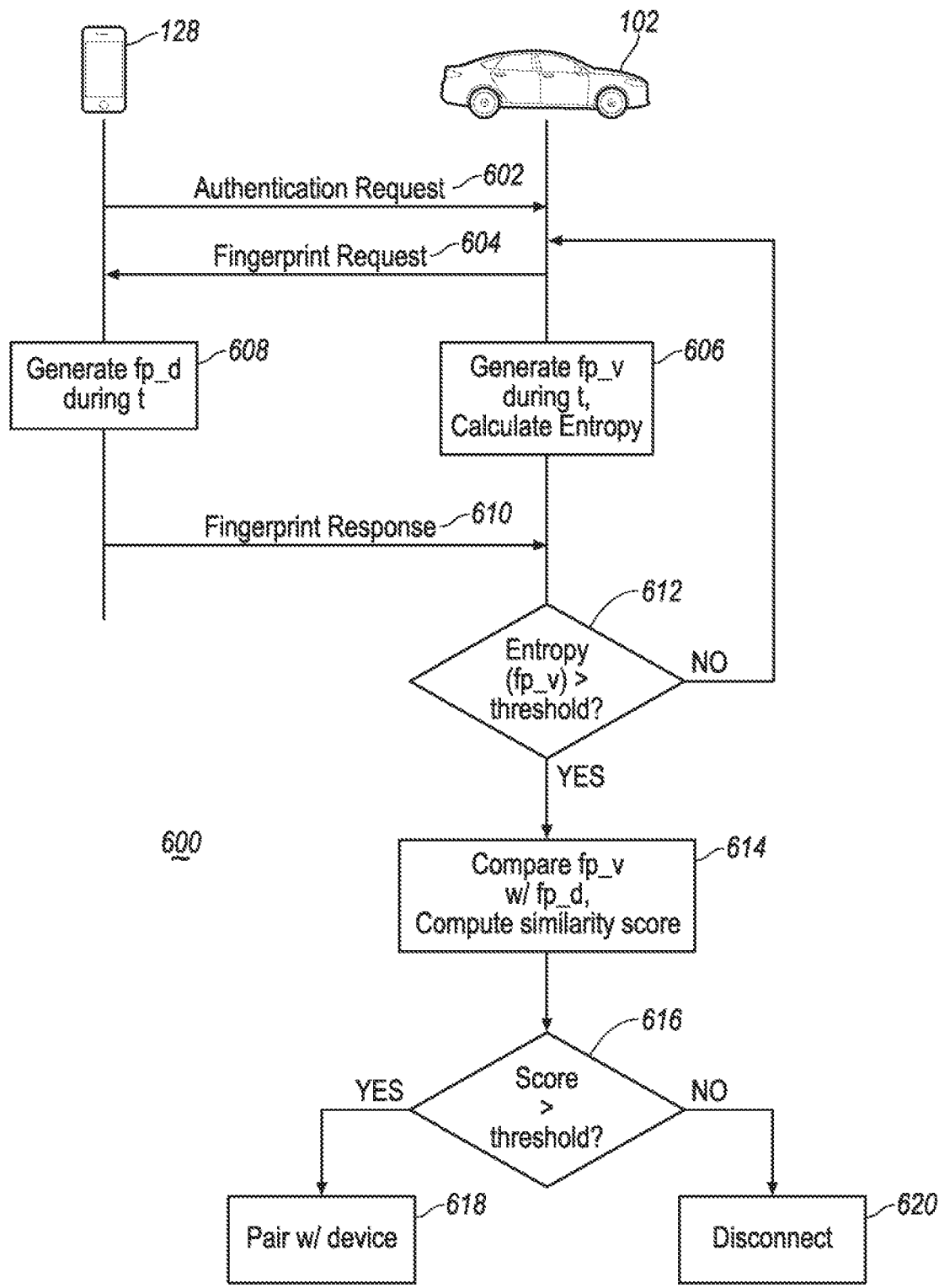
FIG. 6 illustrates an example flow diagram for a pairing authentication process of one embodiment of the present disclosure.

Referring to FIG. 6, a flow diagram for an authentication pairing process 600 of one embodiment of the present disclosure is illustrated. With continuing reference to FIGS. 1 to 5, at operation 602 the mobile device 128 sends an authentication request to the vehicle 102 requesting to authenticate and pair with the vehicle 102. Responsive to the authentication request, the vehicle 102 replies to the mobile device 128 by sending a motion fingerprint request at operation 604. The motion fingerprint request may include a specified timeframe t information in support of synchronization of the comparison. At operation 606, computing platform 104 generates a vehicle motion fingerprint fp_v for the specified timeframe t. As discussed previously with reference to FIG. 4, the computing platform 104 generates the vehicle motion fingerprint fp_v using sensor data collected from the motion sensor 180. Similarly, the mobile device 128 generates the device motion fingerprint fp_d for the specified time frame t at operation 608, and sends the fingerprint fp_d to the vehicle 102 at operation 610. To prevent an unauthorized party from obtaining the fingerprint fp_d, a fuzzy commitment scheme may be used to encrypt the transaction. Details of the fuzzy commitment scheme is introduced below with reference to FIG. 8.

Before comparing the vehicle motion fingerprint fp_v with the device motion fingerprint fp_d, the computing platform 104 first needs to validate the vehicle motion fingerprint fp_v to determine if the vehicle 102 experience maneuver change causing accelerations while the sensor data is collected. This is because when the vehicle 102 stops in the traffic or operates at a constant speed on a highway, no acceleration may be detected. Without accelerations in any directions, the system may be vulnerable to hacking. For instance, in the situation that the vehicle 102 is stuck in traffic, an authorized mobile device of another vehicle parked at a vicinity of the vehicle 102 may generate substantially the same motion fingerprint as the vehicle 102 generates, as very little motion is detected by the motion sensors of the respective vehicle/device. If pairing is allowed between the unauthorized device and the vehicle 102, system security of the vehicle 102 may be compromised. With reference to FIG. 7, a sensor data graph matched with a vehicle driving maneuver graph is illustrated. As can be seen from the graphs, the vehicle does not have any significant maneuvers in the first zone 702 from 0 to 12. The first zone may be a situation in which the vehicle 102 stops at a red light. In the second zone 704 from 12 on, the vehicle starts to operation with various maneuver. Correspondingly, the sensor data starts to vary at the second zone 704.

There are various ways to validate the vehicle motion fingerprint fp_v. For instance, one approach is to check the intensity of driving maneuver inputs including gear shifting, gas pedal pressure/position, brake pedal pressure/position, and steering wheel angles. Additionally or alternatively, the computing platform 104 may be configured to use a quantitative metric to measure the validity of the fingerprint fp_v. As an example, Shannon's entropy may be applied to the present disclosure as the quantitative metric:

$$H(X) = -\sum_{i=1}^{n} p(x_i) \cdot \log_2 p(x_i)$$

p(xi) in the above equation represents bit frequency in the fingerprint fp_v. Continuing to use the finger print bit string where "1" represents motion and "0" represent no motion as discussed above, p(xi) represents the bit frequency of "1" in the fingerprint fp_v. For instance, if a fingerprint fp_v consists of the following string "10000000001000000000" in which there are two "1" bits in a twenty bits string, the entropy of such fingerprint is calculated as:

$$H(X) = -\left(2 \times \frac{2}{20}\log_2\frac{2}{20} + 18 \times \frac{18}{20}\log_2\frac{18}{20}\right) \approx 3.16$$

Whereas for a fingerprint fp_v consisting of "10111000001110011010" the entropy is calculated as:

$$H(X) = -\left(10 \times \frac{10}{20}\log_2\frac{10}{20} + 10 \times \frac{10}{20}\log_2\frac{10}{20}\right) = 10$$

The fingerprint in the second example has a greater entropy than the first fingerprint, since more motion is detected. The entropy calculation may be performed at operation 606 after the fingerprint fp_v is generated.

At operation 612, the computing platform 104 compares the entropy of the vehicle motion fingerprint with a predefined threshold (e.g. "8") to determine if the fingerprint is valid. If the entropy is not greater than the threshold hold, the process returns to operation 604, and the computing platform 104 request the mobile device to generate a new fingerprint fp_d during another time frame. Otherwise, the process proceeds to operation 614, and the computing platform 104 compares the vehicle fingerprint fp_v with the device fingerprint fp_d to determine a similarity score. Hamming distance $h(s_1, s_2)$ indicating number of different bits may be used to calculate the similarity score. The following example illustrates a vehicle and device fingerprint respectively:

fp_v=0000001110000000000000111110000
fp_d=0000000111000111110000001110000

In the above example there are 9 different bits among the 31-bit fingerprint string. The similarity score may be calculated using the equation below:

$$C(s_1, s_2) = \left(1 - \frac{h(s_1, s_2)}{|s_1|}\right) \times 100$$

Applying the above example into the equation, the similarity score is calculated.

$$C(s_1, s_2) = \left(1 - \frac{9}{31}\right) \times 100 \approx 70.96$$

At operation 616, the computing platform 104 compares the similarity score $C(s_1, s_2)$ with a predefined threshold (e.g. "70"). If the similarity score $C(s_1, s_2)$ is greater than the threshold, the process proceeds to operation 618 and the computing platform 104 pairs with the mobile device 128. A confirmation may be sent to the mobile device 128 to allow the mobile device 128 to proceed to authenticate and pair with the vehicle 102 without requiring any user input. Otherwise, the process proceeds to operation 620 to disconnect and prohibit pairing with the mobile device 128.

Figure 8:
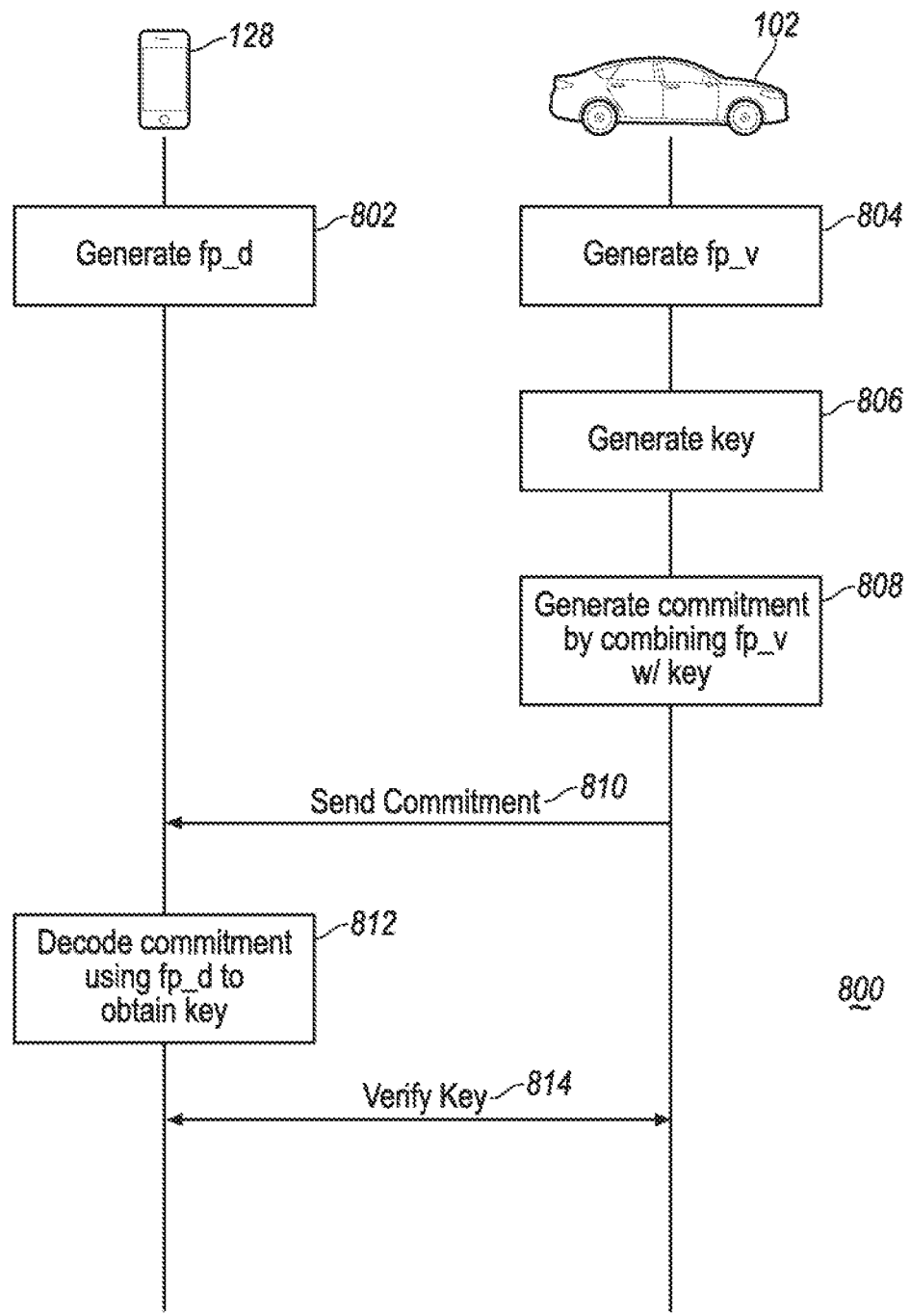
FIG. 8 illustrates an example flow diagram for implementing a fuzzy commitment encryption scheme of one embodiment of the present disclosure.

Referring to FIG. 8, an example flow diagram for a process 800 of a fuzzy commitment scheme of one embodiment of the present disclosure is illustrated. At operations 802 and 804, the mobile device 128 and the vehicle 102 each generates a motion fingerprint fp_d and fp_v respectively as described in operations 608 and 606 with reference to FIG. 6. Here, the fingerprints generated may be the same or a different timeframe t from operations 608 and 606. at operation 806, the vehicle 102 generates an encryption key which is only known to the vehicle 102 itself. At operation 808, the vehicle 102 generates an encryption commitment by combining the vehicle motion fingerprint fp_v with the encryption key, and sends the commitment to the mobile device 128 at operation 810. Responsive to receiving the commitment, at operation 812, the mobile device 128 decodes the commitment using the device motion fingerprint fp_d from operation 802 to obtain the encryption key. Here, a successful decoding relies on the device motion fingerprint fp_d being substantially the same as the vehicle motion fingerprint fp_v. If this is the case, the mobile device 128 may successfully obtain the encryption key, whereas an unauthorized entity may not decode the commitment. At operation 814, the mobile device 128 and the vehicle 102 verify the encryption using nonce values and/or message authentication code (MAC).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
a wireless transceiver, configured to communicate with a mobile device;
a vehicle sensor, configured provide vehicle motion data; and
one or more processors, configured to
responsive to receiving an authentication request from the mobile device, send a request for a device motion fingerprint for a first timeframe to the mobile device,
receive the device motion fingerprint from the mobile device,
generate a vehicle motion fingerprint for the first timeframe using the vehicle motion data,
responsive to a driving maneuver input intensity being greater than an input threshold, compare the vehicle motion fingerprint with the device motion fingerprint to generate a similarity score representative of similarity between the vehicle motion fingerprint and the device motion fingerprint, and
responsive to the similarity score being indicative of at least a predefined threshold level of similarity between the vehicle motion fingerprint and the device motion fingerprint, authenticate a wireless connection between the mobile device and the vehicle via the wireless transceiver,
wherein the driving maneuver input intensity includes intensity of input received to at least one of: a gear shifter, a gas pedal, a brake pedal, or a steering wheel.

2. The vehicle of claim 1, wherein the one or more processors are further configured to:
generate an entropy of the vehicle motion fingerprint using a bit frequency of the vehicle motion fingerprint;
compare the entropy with an entropy threshold; and
responsive to the entropy being less than the entropy threshold, send a second request for a second device motion fingerprint for a second timeframe to the mobile device.

3. The vehicle of claim 1, wherein the similarity score is calculated based on a measure of bit differences between the vehicle motion fingerprint and the device motion fingerprint.

4. The vehicle of claim 1, wherein the vehicle sensor includes at least one of: an accelerometer, or a gyroscope.

5. The vehicle of claim 1, wherein the one or more processors are further configured to:
responsive to determining the vehicle is located on a flat surface, remove a gravity vector from the vehicle motion data by identifying and removing a vertical acceleration vector to generate a motion vector.

6. The vehicle of claim 1, wherein the one or more processors are further configured to:
remove a gravity vector from the vehicle motion data using a low-pass filter to generate a motion vector.

7. The vehicle of claim 6, wherein the one or more processors are further configured to:
divide the motion vector into the first timeframe.

8. The vehicle of claim 7, wherein the one or more processors are further configured to:
normalize the motion vector using a predefined standard to generate a normalized motion vector.

9. The vehicle of claim 8, wherein the one or more processors are further configured to:
transform the normalized motion vector into the vehicle motion fingerprint including multiple binary bits.

10. A method for a vehicle, comprising:
collecting vehicle motion data via a motion sensor;
responsive to receiving an authentication request from a mobile device, sending a request for device motion fingerprint for a first timeframe to the mobile device;
receiving the device motion fingerprint from the mobile device;
generating a vehicle motion fingerprint for the first timeframe using the vehicle motion data collected via a vehicle sensor;
generating an entropy of the vehicle motion fingerprint using a bit frequency of the vehicle motion fingerprint;
comparing the entropy with a predefined threshold;
responsive to the entropy being greater than the predefined threshold, comparing the vehicle motion fingerprint with the device motion fingerprint to generate a similarity score representative of similarity between the vehicle motion fingerprint and the device motion fingerprint; and
responsive to a similarity score being indicative of at least a score threshold level of similarity between the vehicle motion fingerprint and the device motion fingerprint, authenticating a wireless connection between the mobile device and the vehicle.

11. The method of claim 10, further comprising:
calculating a driving maneuver input intensity using input data of at least one of: a gear shifter, a gas pedal, a brake pedal, or a steering wheel; and
responsive to the driving maneuver input intensity being less than an input threshold, comparing the vehicle motion fingerprint with the device motion fingerprint.

12. The method of claim 10, further comprising:
removing a gravity vector from the vehicle motion data using a low-pass filter to generate a motion vector;

segmenting the motion vector into the first timeframe;
normalizing the motion vector using a predefined standard to generate a normalized motion vector; and
transforming the normalized motion vector into the vehicle motion fingerprint including multiple binary bits.

13. The method of claim 12, further comprising:
measuring a driving maneuver input intensity of the vehicle; and
responsive to detecting the driving maneuver input intensity being greater than an input threshold, comparing the vehicle motion fingerprint with the device motion fingerprint to generate a similarity score,
wherein the driving maneuver input intensity includes at least one of: a gear shifting, a gas pedal position, a brake pedal position, or a steering wheel angle.

14. The method of claim 12, wherein the similarity score is calculated based on a number of bit differences between the vehicle motion fingerprint and the device motion fingerprint.

15. The method of claim 10, further comprising:
responsive to determining the vehicle is located at a flat surface, removing a gravity vector from the vehicle motion data by identifying and removing a vertical acceleration vector.

16. A non-transitory computer-readable medium, comprising instructions, when executed by a processor of a vehicle, cause the processor to:
responsive to receiving an authentication request from a mobile device, send a request for a device motion fingerprint for a first timeframe to the mobile device,
receive the device motion fingerprint from the mobile device,
generate a vehicle motion fingerprint for the first timeframe using vehicle motion data detected via a vehicle sensor,
generate an entropy of the vehicle motion fingerprint using a bit frequency of the vehicle motion fingerprint,
compare the entropy with an entropy threshold,
responsive to the entropy being greater than the entropy threshold, and a driving maneuver input intensity being greater than an input threshold, compare the vehicle motion fingerprint with the device motion fingerprint to generate a similarity score representative of similarity between the vehicle motion fingerprint and the device motion fingerprint, and
responsive to the similarity score being indicative of at least a predefined threshold level of similarity between the vehicle motion fingerprint and the device motion fingerprint, authenticate a wireless connection between the mobile device and the vehicle,
wherein the driving maneuver input intensity includes intensity of input received to at least one of: a gear shifter, a gas pedal, a brake pedal, or a steering wheel.

17. The non-transitory computer-readable medium of claim 16, further comprising instructions, when executed by a processor of a vehicle, cause the vehicle to:
remove a gravity vector from the vehicle motion data using a low-pass filter to generate a motion vector,
divide the motion vector into the first timeframe,
normalize the motion vector using a predefined standard to generate a normalized motion vector, and
transform the normalized motion vector into the vehicle motion fingerprint including multiple binary bits.

18. The non-transitory computer-readable medium of claim 16, wherein the similarity score is calculated based on a measure of bit differences between the vehicle motion fingerprint and the device motion fingerprint.

19. The non-transitory computer-readable medium of claim 16, further comprising instructions, when executed by a processor of a vehicle, cause the vehicle to:
responsive to determining the vehicle is located on a flat surface, remove a gravity vector from the vehicle motion data by identifying and removing a vertical acceleration vector to generate a motion vector,
divide the motion vector into the first timeframe,
normalize the motion vector using a predefined standard to generate a normalized motion vector, and
transform the normalized motion vector into the vehicle motion fingerprint including multiple binary bits.

20. The non-transitory computer-readable medium of claim 16, further comprising instructions, when executed by a processor of a vehicle, cause the vehicle to:
generate an encryption key,
combine the encryption key with the vehicle motion fingerprint to generate a commitment,
send the commitment to the mobile device, and
verify the mobile device has successfully decoded the commitment using a nonce value and message authentication code communicated with the mobile device.

* * * * *